United States Patent Office 3,841,992
Patented Oct. 15, 1974

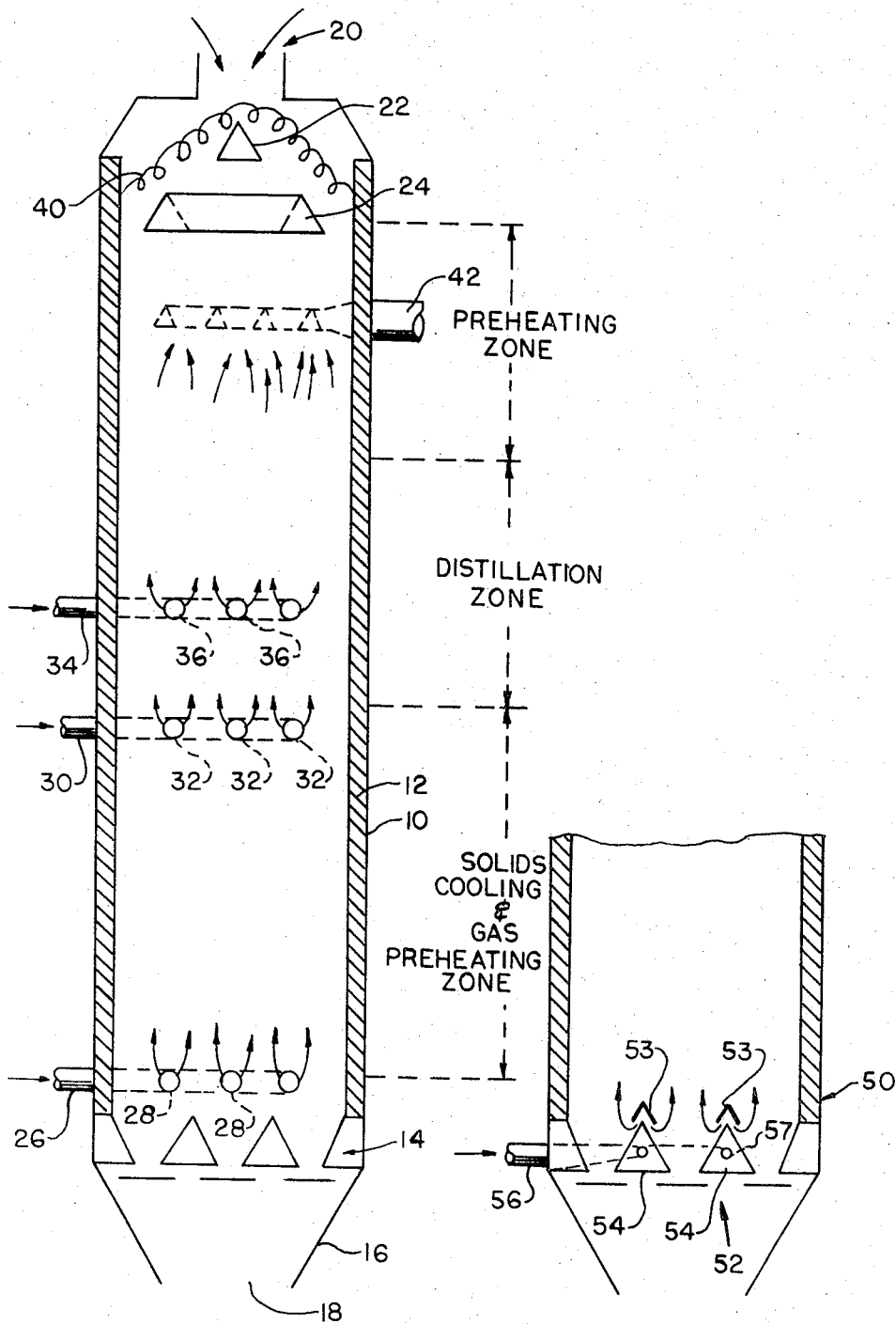

3,841,992
METHOD FOR RETORTING HYDRO-
CARBONACEOUS SOLIDS
John B. Jones, Jr., and Adam A. Reeves, Denver, Colo.,
assignors to Paraho Corporation, Denver, Colo.
Filed Dec. 1, 1972, Ser. No. 311,248
Int. Cl. C10b 53/06
U.S. Cl. 208—11                                    15 Claims

ABSTRACT OF THE DISCLOSURE

A process for the destructive distillation of the organic matter in hydrocarbonaceous solids using shaft vessels in which pulverulent solids are moved continuously downwardly in a continuous vertical column through successive heating zones and then into a residual cooling zone, thereby volatilizing some of the hydrocarbonaceous material included in the solids. The distillation is conducted by using produced gases from the distillation, *externally heated* and recycled through the column of material, in addition to a portion of the product gases which are cooled and recycled into a lower portion of a bed, cooling the solid residue and being heated during passage upwardly through the column of material, maintaining an efficient heat balance for the process. The process includes multiple injection levels in the column of material for a controlled exposure time of the solid material to gases of controlled composition at predetermined temperatures for an efficient and economical process for recovery of volatile organic material from the solids.

---

Shale oil is not a naturally occurring product, but it is formed by the pyrolysis or distillation of organic matter (commonly called kerogen) found in certain shale-like rock. The organic material has limited solubility in ordinary solvents, and therefore cannot be recovered by extraction. Upon strong heating, the organic material of some of these materials decomposes into gas, condensible liquids and residual carbonaceous material remaining on the spent shale.

In its basic aspects, the retorting of oil shale, and also other similar solid, hydrocarbonaceous materials, is a simple operation. The major steps involve the heating of the solid material to the proper temperature and the recovery of the vapor evolved. However, for a commercially feasible process it is necessary to consider and porperly choose one of the many of the possible methods of physically moving the solid material through a vessel in which the retorting is to be carried out, as well as many other variants and operating parameters, all of which are interrelated. The choice of a particular method of moving the solids through the vessel must include a consideration of mechanical aspects as well as the chemistry and the processes involved. Further, it is necessary to consider the many possible sources of heat that may be used for the pyrolysis, or destructive distillation, including the most economical and advantageous method of utilizing such heat to produce the desired products. In order for a retorting operation to be economically attractive, it must be self-supporting as far as energy requirements are concerned. Generally the most feasible process is to derive the heating requirements from some of the various products of the pyrolysis using, however, a minimum of the valuable products of the process. Another area of consideration is the possible method of transferring heat to the solid material and the recovery of heat not actually utilized in the process itself, utilizing the principles of countercurrent heat exchange between gas and solids.

In order to achieve a retorting process that is economically attractive, the various operating parameters must be controlled so that the overall process is economical, continuous and highly reliable. Any equipment usable in the process must permit a high unit throughput of material since enormous quantities of the oil shale must be handled for a relatively nominal recovery of shale oil. The largest deposits of oil shale found in the United States lie in the semi-arid locations of Colorado, Utah and Wyoming. Process equipment for these shale reserves must have a high thermal efficiency which requires little if any cooling water. As in the case of all mechanical devices, the retorting equipment should be as simple as possible so that relatively proven and economically attractive mechanical devices may be utilized in the operation of the retort.

In an effort to provide an economic commercial process, literally hundreds of retorting processes have been proposed, each of which offers a somewhat different choice and/or combination of the many possible operating conditions. Some of the processes appear to meet the majority of the requirements, but for one reason or another have failed to be economically attractive in a sufficient degree to encourage widespread commercial utilization of the oil shales in the United States.

An object of the present invention is to provide an economic process for the destructive distillation of oil shale and other hydrocarbonaceous material which possesses to a high degree all of the important requirements necessary for overall economic and efficient operations in the recovery of liquid and gaseous values from the rock and gangue.

A further object of the invention is to provide a retorting process which is continuous in operation, capable of operating with high thermal efficiency and high unit throughput with the use of little or no cooling water, permits recovery of a maximum amount of potentially high yield of liquid and gaseous products, produces a gas product which is not contaminated with products of combustion, and which accomplishes these ends in a manner using the device of very simple and easily maintainable design.

Another object of the invention is to provide an economical process for the destructive distillation of hydrocarbonaceous materials utilizing externally heated products of such distillation for distillation of additional material.

Another object of the invention is to provide a process in which the properties of the gases in contact with the solids can be modified to adjust the properties and quantities of the fixed gases, condensable liquids and residual carbonaceous material on the spent shale so as to improve the overall economic operation of the commercial oil shale plant.

Yet another object of the invention is to provide a retorting process having high thermal efficiency with a high throughput and high yield of liquid and gaseous products.

Still another object of the invention is to provide a retorting process for oil shale having adjustable properties and quantities of the fixed gases, condensable liquids and residual carbonaceous material with improved economics in commercial plant operations.

A further object of the invention is to provide an improved retorting process having maximum interaction between gas and solid materials at elevated temperatures.

An additional object of the invention is to provide a retorting process involving the injection of controlled quantities of oxygen into various elevations of the retort vessel with or without a water fog to produce carbon monoxide from residue carbon on the solids.

In general, the improved retorting process of the present invention involves steps of continuously passing solid particulate material having included hydrocarbonaceous material downwardly in a substantially vertical column successively through a preheating zone, a heating and distillation zone, and then a residual cooling zone. The hot solid residue from the heating zone is passed through the cooling zone to a relatively cool position at the base of the column while the distillation products are removed from inside the bed near the top of the column. At least a portion of the product gases, in a cool condition, is recycled into a lower portion of the bed or column and these gases pass upwardly through the downwardly moving residue from the heating zone, thus cooling the hot residue with the gas itself becoming heated. The distillation of the hydrocarbonaceous matter is accomplished with hot product gases, and heat is exchanged in countercurrent fashion between the rising gases and the downwardly moving material.

In an upper portion of the residual cooling zone, at least a portion of the recycle gas, which is now relatively hot, is mixed with incoming externally heated recycled gas to produce the overall heating media for the distillation or pyrolysis. The externally heated recycled gas is injected into the bed at at least two levels generally centrally of the column. This multiple injection provides for a radical improvement in the exposure time of a solid material to predetermined temperatures and thereby drastically improves the throughput capacity of the unit. This obtains the maximum interaction between the gas and solid materials at these elevated temperatures, as compared with the heated recycled gas injected only at one level. The heated recycled gas that has been injected at multiple levels in the middle portion of the bed mixes with the rising recycled gas injected in the lower portions of the bed and which has been heated as it rises through the cooling portion of the bed. Thus all of the recycled gas injected into the bed at all levels then becomes the heating media for the distillation or pyrolysis. During the distillation or pyrolysis, the products including liquid mist and gas from the solid material passes upwardly to the discharge for the fluid products. The recycled gas injected into the middle portions of the bed is externally heated, usually by combustion of the residual carbonaceous material on the solid material, or combustion of the non-condensible, combustible gaseous components of the product gas. This heated recycled gas is a substantial part of the heating media. Additionally, by controlling the positioning of the injection of the heated recycled gas in the bed, the residence time of the solids subjected to the temperature (sufficient for distillation) may be accurately controlled. Further, the particles may be subjected to the distillation temperature for a sufficient length of time to completely heat the particles uniformly from the exterior to their core for highly efficient distillation of volatile material. Accurate control of the temperature of the heating media is readily accomplished and thus accurate control of the temperature of the solids is achieved.

The heat transfer and input heat-carrying medium may be recycled product gas. It may be product gas modified in its composition by gas separating and mixing processes external of the shaft vessel. It may be product gas modified by the injection of a gas or liquid component whose source is external of the retorting process. One favorable modification is the injection of water (as a fog) or steam beneath or into the distillation zone. Carbon monoxide is normally formed in the distillation zone and is present in the recycled product gas. Water vapor will combine with carbon monoxide in the following reaction called the water-gas shift:

$$CO + H_2O \rightarrow H_2 + CO_2$$

This reaction is mildly exothermic and will take place at a substantial rate at temperatures above about 600° Fahrenheit. Thus, the hydrogen content of the product gas and recycle gas will increase. For oil shale, higher partial pressure of hydrogen in the kerogen conversion zone will produce a better oil product, being less cracked. The oil will tend to have less sulfur and nitrogen content. Excess water vapor will reduce the molecular weight of the gas in the conversion zone providing a better medium for stripping the volatile products from the solid particles.

Another favorable modification is the injection of carbon dioxide to the cooling medium recycled to the bottom of the retort. The recarbonation of the partially decomposed magnesium and calcium carbonates will decrease the overall endothermic carbonate decomposition reactions requiring less externally generated heat for the process.

Saturated steam as a coolant injected into the bottom of the retort has a disadvantage in the external heat requirement to generate the steam. A water fog injected into the retorted shale along with spent gas utilizes the sensible heat of the retorted shale to generate steam which is passed up into the distillation zone to react with the CO.

Another favorable modification is the injection of oxygen with the water fog to gasify some of the carbonaceous material on the retorted solids to further increase the hydrogen and carbon monoxide in the fluids entering the distillation zone. The reaction is

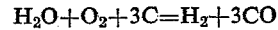
$$H_2O + O_2 + 3C = H_2 + 3CO$$

The produced gaseous products commingle with recycled gas and while still relatively hot, pass upwardly through the column from the distillation zone. This causes heating of the feed material charged into the top portion of the column and simultaneously cooling of the gas by the contact with the raw hydrocarbonaceous material. The distillation products rapidly cool and the solid material becomes heated. As the distillation products rise through the bed and are cooled, the oil vapors become subcooled and condense as droplets of oil. The mixture of uncondensed gases and entrained oil mist is disengaged from the bed of solids and is conduited to equipment suitable for removing the oil mist as a liquid stream.

In the drawings:

FIG. 1 shows a shaft kiln for operating the process of the invention;

FIG. 2 is a modified form of a shaft kiln grate for injection of cool product gas into the bed of shale;

Figure 3:
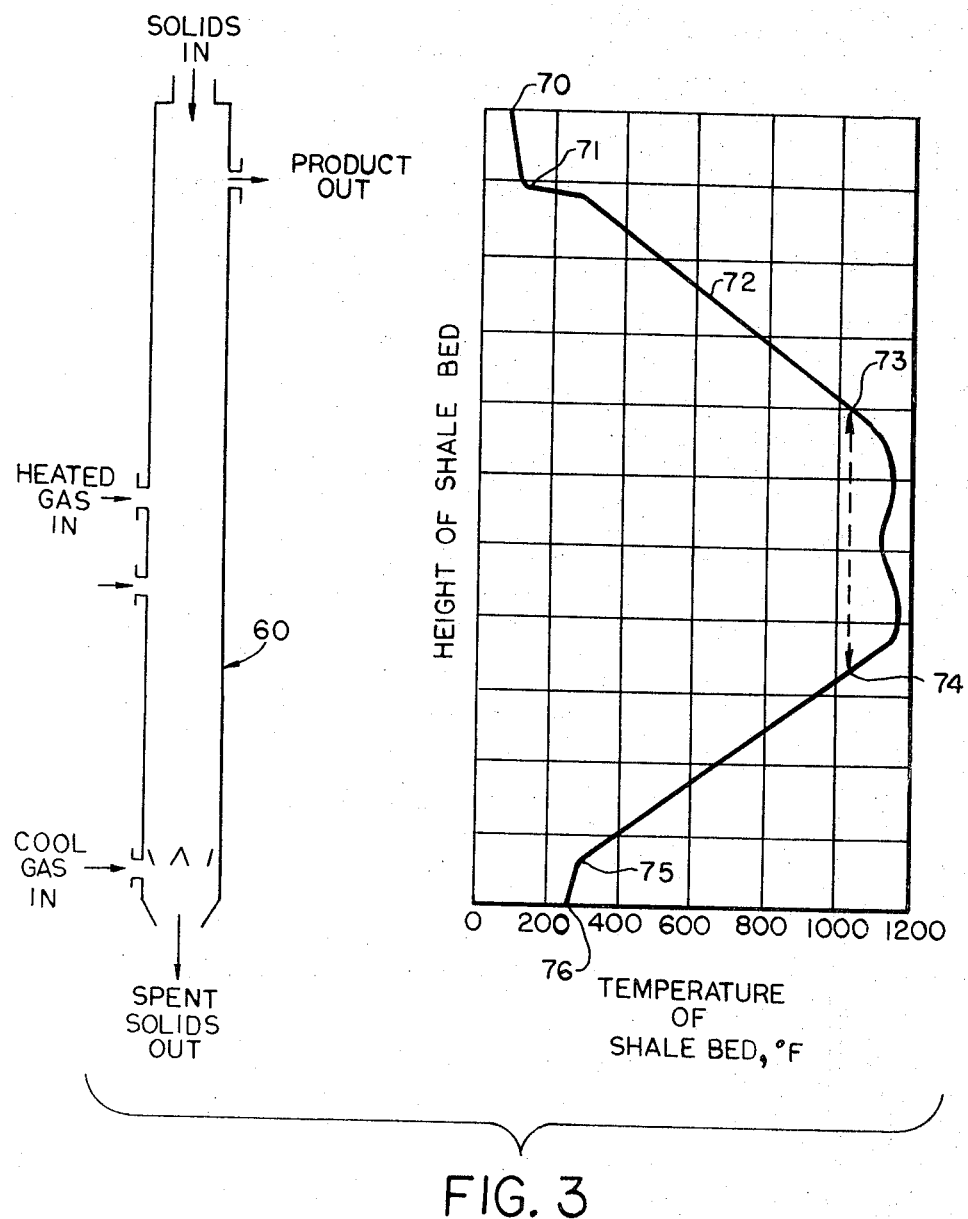
FIG. 3 is a diagrammatic representation of a temperature profile in a shaft kiln, shown in schematic form, in a distillation of oil shale.

The shaft kiln includes an outer shell 10 of metal with an inner lining of refractory 12. At the lower end of the kiln a graft structure, shown in general by numeral 14, supports the material in the column and releases predetermined portions of the material. A grate such as shown in my U.S. Pat. No. 3,401,922 issued Sept. 17, 1968, title "Linear Grate for Shaft Kilns," also my Pat. No. 3,373,982, issued Mar. 19, 1968 titled "Radial Grate for Shaft Kilns," could be utilized in the present invention. A lower section 16 provides an outlet 18 for spent solids. Normally a sealing device is provided in the opening 18 for the controlled release of material from the kiln, for example, a star feeder valve, and to prevent gas from discharging from the lower end. A charge means or other particulate solids feed mechanism is arranged at the opening 20 for feeding material into the retort and prevent release of off-gas therefrom. Feeding mechanisms are well known in the art and any convenient device may be used. A distributor device 22 is mounted below the opening 20 for spreading the material through the cross-sectional extent and another spreader device 24 mounted therebelow aids in the unform distribution of the material across the extent of the kiln. A lower manifold 26 provided with a plurality of openings 28 (shown schematically) provides means for injecting cool recycled gas into the lower portion of the bed of solids. A similar upper injection manifold 30 provided with a plurality of openings 32 provides means for injecting heated recycled gas into the column. Another similar manifold 34 is mounted thereabove and it is provided with outlets 36 therein for distributing the gas across the extent of the column. The injection devices may be such as are described in my Pat. No. 3,432,348 issued Mar. 11, 1969, titled "Fluid Distributor for Vertical Vessels," also my Pat. No. 3,589,611, issued June 29, 1971 titled "Distributors for Injecting Fluids Into Vessels," or such equivalent manifolds and distributors as to provides means for distributing the gas across the lateral extent of the column for uniformly contacting the bed of particulate solids. A column of material is maintained in the kiln from the grate to about an upper fill line 40 by controlling the rate of feed and the rate of discharge through the grate. Thus, the height of the column remains the same, but the column is, in effect, a downwardly moving bed of particulate solids. An off-gas (product gas and liquids) collector system 42 is mounted in the retort submerged in the bed of solids for the recovery of mist and gas produced by the distillation of the contained carbonaceous material in the distillation zone. A suitable off-gas collector would be my patent, U.S. Pat. No. 3,561,927 issued Feb. 9, 1971. The arrangement of the kiln provides three distinct zones which include a preheating zone in the upper part, a distillation zone in the central part, and a solids cooling and gas preheating zone in the lower part of the retort.

In the operation of the kiln or retort for retorting oil shale, particulate oil shale is introduced into the top of the retort from a hopper by the feed system through the upper inlet 20 to form the column. The top of the column is maintained relatively stable at about line 40. The incoming shale from the feed system is normally at ambient temperature, hence the shale is not preheated prior to introduction into the retort. The shale particle size may vary within relatively wide limits, both as to maximum and minimum particle size. Depending upon the size of the retort and the operating conditions in the retort, the preferred upper limits being 4 to 6 inches maximum particle size, and lower limits preferably in the ⅛–½ inch size. The shale moves downwardly through the retort under the influence of gravity as a bed of freely moving particles which pass successively through the three stages or zones. The products of the distillation, that is, the fluid which is gas and vapor and later a mixture of gas and liquid droplets, moves upwardly through the preheating zone and pass out through the off-gas recovery system 42. The spent shale passes downwardly through the column from the distillation zone, through the cooling zone. The cooled spent shale then passes out through the grate and a discharge mechanism at the outlet 18. The vaporous product from the retorting passes through a products recovery system, not shown, which may be of more or less conventional design for the recovery of liquid droplets. The permanent gases from this recovery unit are then passed to a manifold where a portion of the subsequently cooled gases is then recycled into the bottom of the retort. Part of the gas is heated in an external heater and then injected into the bed through the multiple level distribution system 30 and 34. Part of the cooled gas is injected into the bed through the manifold 26, and as this cooled gas rises through the bed it cools the solids which have been heated in the distillation zone and simultaneously the gas itself becomes heated. At distributor 30, the rising gas joins with the gas from the distributor 26 and thereabove with the gas from distributor 34 to form the heating media for the shale in the distillation zone. The products of distillation and the heating gases rise through the bed of particulate solids above the distillation zone and are cooled by the feed shale, but simultaneously heating these solids passing down through the column. The cooled gases are removed by the fluid products collector 42 in the shale bed.

Water or water vapor can be injected into the stream entering at distributor 30. The water source can be condensation from the stream exiting from the kiln at point 42 (for example, by using an air-cooled condenser following the oil mist removal equipment), or it can be water from an outside source.

Carbon dioxide may be injected into the kiln at distributor 26 or at any intermediate point thereabove. The source of carbon dioxide can be the product gases (for example, by an absorption and stripping system) or from an outside source.

A modified form of the invention is illustrated in FIG. 2, where a kiln 50 is provided with a grate mechanism 52 provided with shields 53 above divider plates 54 in the grate mechanism, shown in my U.S. Pat. No. 3,401,922 issued Sept. 17, 1968, title "Linear Grate for Shaft Kilns." The gas, which is introduced into the column by a distributor 56 into manifolds 57 in the grate, passes into the column of shale from the bottom edges of the shields 53 so that the gas passes into the bed in similar manner to that of FIG. 1. By injecting the gases into the shale bed less dust is reentrained and carried back into the shale column than in the case of admitting cooling gas below the grate mechanism 52. Also, by injecting gas close to, but above, the solids discharge mechanism, and under the shields 53, there is no restriction to the flow of solids and inactive volume in the kiln is minimized.

In FIG. 3 a typical temperature profile of an operation is illustrated. In this case, a retort 60 is provided with a solids inlet at the top, a product outlet near the top, heated gas inlets in the center portion, and a cool gas inlet at the bottom. Spent solids are removed from the bottom, as described for FIG. 1. The entering solids are removed from the bottom, as described for FIG. 1. The entering solids are at ambient temperature, point 70 on the chart of FIG. 3, and they are slightly raised in temperature to the point 71, where the product gas is discharged from the kiln. From point 71 the temperature of the solids rises rapidly along the line 72 to the distillation temperature 73. The heating gas and the products of the distillation rising through the bed between the heated gas inlet and the product outlet increases the temperature of the downwardly moving shale to the distillation temperature. The shale in the distillation zone may be raised to a temperature somewhat above the actual distillation temperature. The distance between the points 73 and 74 represents the time that the shale is subjected to the distillation temperatures. The maximum temperature that the shale reaches is conrolled by the temperature and quantity of heated gas injected into the shale in relation to the quantity of the cooled gas injected into the bottom of the shale column. This temperature should be above the minimum distillation point to provide sufficient heating capacity for the shale and provide effective and efficient distillation of the volatile ingredients of the oil shale. The two levels of injection of heated gas give rise to two maximum temperature points between the points 73 and 74 with a slight depression of temperature between the two points of injection. Below the point 74 the shale cools rapidly, due to heat transfer to the cooling gas injected at point 75 which cools the shale as it heats rising through the shale. The spent shale is then discharged at a temperature indicated by point 76 on the scale, somewhat about 200° F.

Figure 4:
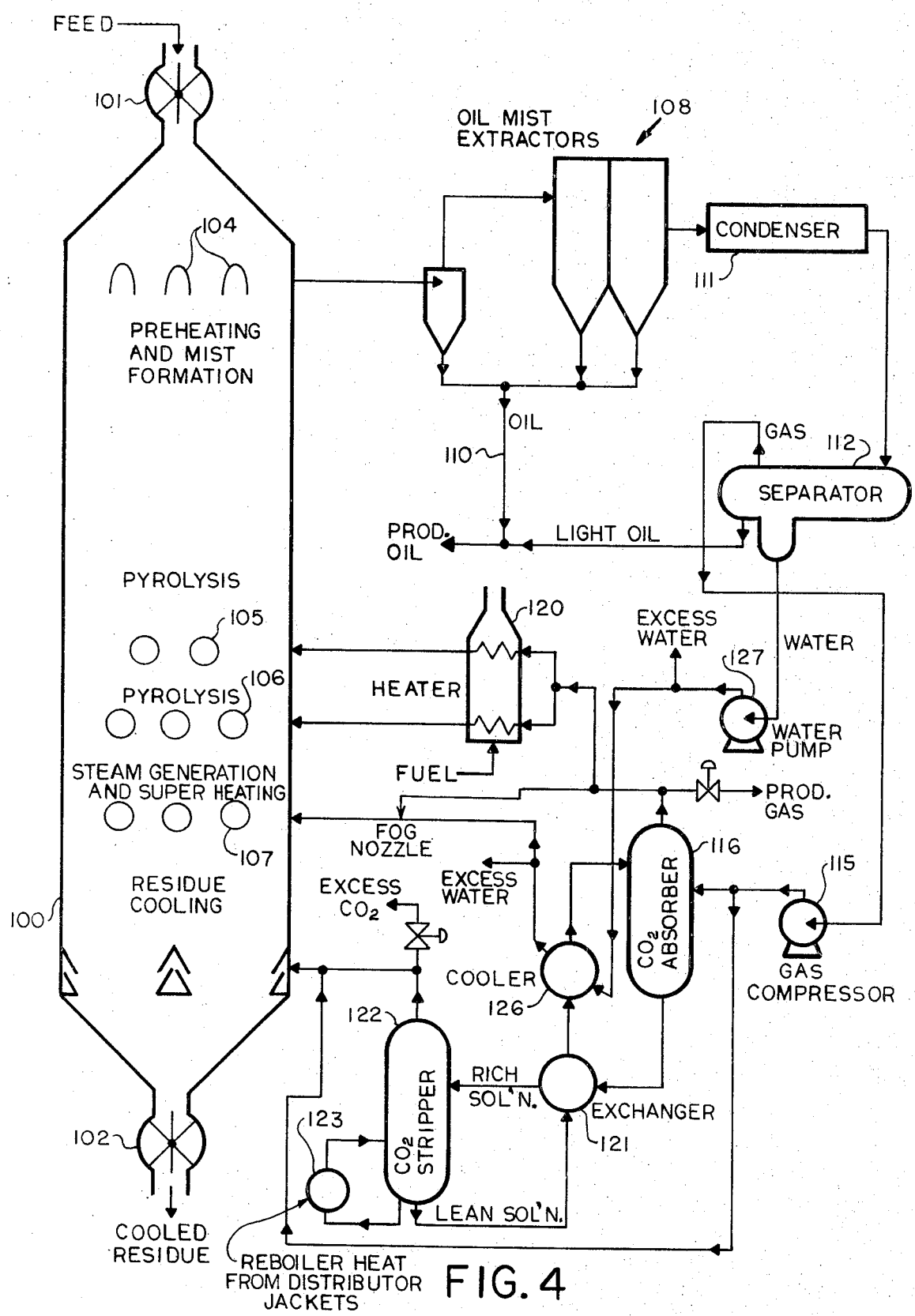
FIG. 4 is a schematic diagram of a system of retorting oil shale using recycled gases, according to the invention.

The system of FIG. 4 utilizes a kiln 100 with a feed inlet 101, preferably a star feeder for preventing the escape of gas, and residue outlet 102, also a star feeder. The zones are shown from the top down from the preheating, pyrolysis, steam generating and cooling. Fluid products and entrained liquid droplets are withdrawn from off-gas collectors 104. Injectors 105, 106 and 107 in the mid sections provide heating gases, etc. The off-gas passes through mist extractors, shown in general by numeral 108, and recovered oil passes through outlet 110. The gas from the extractors is passed through a condenser 111. The mixed gas and condensate is separated in a separator 112, the liquid is mixed with liquid from the mist extractors, and the resultant liquid is the oil product. This oil is conveyed, for further processing, to a refinery or other process equipment. The non-condensable gas is passed to a compressor 115. The gaseous mixture from the extractors 108 may, also, by-pass the condenser 111 and separator 112 to feed directly the gas compressor 115. From the compressor the gases may pass directly into the heater 120 and then into the bottom or any desired elevation in the vessel.

From the compressor, the compressed gas goes through a $CO_2$ absorber 116. Gas from the top of the absorber is split to product gas and to recycle through distributors 105 and 106. The recycle gas is heated in heater 120 to shale pyrolysis temperature. The rich $CO_2$ solvent from the bottom of absorber 116 passes through an exchanger 121 and $CO_2$ rich solvent passes into a $CO_2$ stripper 122 having a $CO_2$ solvent reboiler 123. Lean solvent from the stripper is passed to the exchanger 121. The rich solvent goes into the stripper. The solvent from the exchanger is lean in $CO_2$ and it passes through a cooler 126 and then into the $CO_2$ absorber 116. Water from a pump 127, fed from separator 112, is injected into the recycle gas from $CO_2$ absorber 116 to form a fog which is injected into the kiln through distributor 107. Excess water is removed from the line and some recycle gas may be injected into the line. The coolant gas may be a predetermined mixture of gas from the compressor 115 enriched with various quantities of $CO_2$ from the stripper 122. The $CO_2$ absorber, stripper and reboiler system is generally known, however, the particular hook-up is unique to the system.

As pointed out above, oxygen may be injected into the bottom of the kiln and/or into distributors 107 to produce carbon monoxide. Such multiple level of injection provides for the maximum interaction between the solids and the gases. This, also, provides a controlled gas composition which will have the maximum impact on the quantity and properties of the gas and liquid products withdrawn through the off-gas collectors 104.

Further, hydrogen may be introduced in the cooling gas in either the upper or lower injection level to change the composition of the products of distillation. Additionally, the composition of the heated gases entering the column may be changed, i.e., adding hydrogen, to control selected reactions during the distillation. Usually, hydrogen is added to the upper injected, heated gases to provide different reactions between the gases and the solids.

One of the major advantages of the method of operating the retort is shown through the concepts of the multiple injection of the heating gas, which controls the depth of the bed that is maintained at the desired temperature for efficient distillation of the carbonaceous containing solids. The multiple injection of the heated gases into the bed provides an effective control on the residence time of the solids at distillation temperatures. The number of injection points or levels in the column is a matter of economics in relation to the nature of the rock treated. Normally, the larger the size of the particulate rock, the longer the residence time that is required at the treatment. Temperature and more than two heated gas injection levels are necessary. The height of the preheating, distillation and cooling zones, of course, determines the height necessary for the column of solids in the retort.

As used in the specification, the term "oil shale" is intended to mean inorganic material which is predominantly clay, shale, or sandstone, in conjunction with organic material composed of carbon, hydrogen, sulfur, oxygen and nitrogen, called kerogen. The permanent gases referred to are non-condensable gases at the pressures and temperatures of the recovery system. The carbonaceous residue on the spent shale and the combustibles in a portion of the recycle gases are ordinarily used as the combustible material used for heating the recycle gases; however, other sources of thermal energy may be used. The cooled gas from product recovery system is ordinarily less than about 160° F. (preferably in the range of 120°–160° F.), and on passage upwardly through the shale it recovers the sensible heat in the hot shale which in turn is cooled by the gas.

When the term carbonaceous containing solids is used, it is intended to include oil shales, oil sands, coal, tar sands, gilsonite, mixtures of two or more of the materials or any of the carbonaceous containing solids with inert materials, etc.

Automatic control of the system is relatively simple. The temperatures of the distillation zone, and the cooling zone are readily controlled by varying the ratio of the injected gases into the column to the rate of shale flowing in the column. The exhaust of product gas and mist along with the heating gas may be by the pressure in the column or assisted by suction fans leading the condensation system.

While the invention has been described with reference to the specific examples and embodiments, it is intended merely as an illustration of the invention, and not as a limitation on the scope thereof except as defined in the appended claims.

We claim:

1. In a continuous method of the destructive distillation of material containing carbonaceous matter or the like without combustion in a vertical column of particulate matter having a top feed for raw matter and a bottom discharge for processed solids, thereby providing movement of the particulate matter from top to bottom through the column, the improvement of
   (1) withdrawing off-gas products and oil mist from a level internally of said column adjacent to but below the top of the column;
   (2) introducing a $CO_2$ enriched cooling gas internally of said column at a lower level therein adjacent to but above the spent matter discharge and internally of the column to cool the spent matter and to be simultaneously heated thereby; and
   (3) introducing externally heated recycled oxygen lean off-gas products at a temperature in excess of the distillation temperature into said column of matter in at least two levels in about the central portion of the column, said at least two levels being spaced apart a sufficient distance to provide the desired residence time for the downwardly moving matter to produce a predetermined retorting temperature level of about 1000–1200° F., said recycled gas having insufficient oxygen for combustion of the carbonaceous matter in the column, said heated gas joining with the rising now heated cooling gas to form the heating media for the distillation of the matter in the central portion of the column.

2. The method of claim 1 wherein the carbonaceous matter is oil shale.

3. The method of claim 1 being further characterized wherein unheated gas is mixed with a water fog and the resulting mixture introduced at a higher level than the cooling gas and a lower level than that heated gas.

4. The method of claim 1 wherein the heated gas contains more water vapor content than the cooling gas.

5. The method of claim 1 wherein a significant quantity of carbon dioxide is added to the cooling gas so that the carbon dioxide content of the cooling gas is greater than in the heated gas entering the column.

6. The method of claim 1 wherein recovered water from the off-gas is recycled into the column.

7. The method of claim 1 wherein said cooling gas is recovered from said off-gas products and recycled into said column.

8. The method of claim 1 wherein a minor quantity of oxygen and a water fog is introduced in to said column at least one level below the introduction of said heated recycled gas.

9. The method of claim 1 wherein a minor quantity of oxygen and a water fog is injected with cooling gas.

10. The method of claim 1 wherein oxygen is introduced with cooling gas.

11. The method of claim 1 wherein hydrogen is introduced with said cooling gas.

12. The method of claim 1 wherein hydrogen is introduced with said heated recycled off-gas products.

13. The method of claim 1 wherein cooling gas is injected into said column through the bottom discharge thereof.

14. The method of claim 1 wherein the composition of said heated recycled off-gas products injected at least at two levels has a different composition at each said level.

15. The method of claim 14 wherein the injected gas of the upper of at least two levels contains more hydrogen than the injected gas of the lower level.

References Cited
UNITED STATES PATENTS

| | | | |
|---|---|---|---|
| 3,736,247 | 5/1973 | Jones et al. | 208—11 |
| 3,384,569 | 5/1968 | Peet | 201—34 X |
| 3,318,798 | 5/1967 | Kondis et al. | 201—34 X |
| 3,464,913 | 9/1969 | Berry | 201—34 |

WILBUR L. BASCOMB, JR., Primary Examiner

D. EDWARDS, Assistant Examiner

U.S. Cl. X.R.

201—29, 30, 34, 36, 38